F. M. SMILEY.
DRAFT EQUALIZER.
APPLICATION FILED AUG. 28, 1908. RENEWED NOV. 8, 1909.
946,405. Patented Jan. 11, 1910.
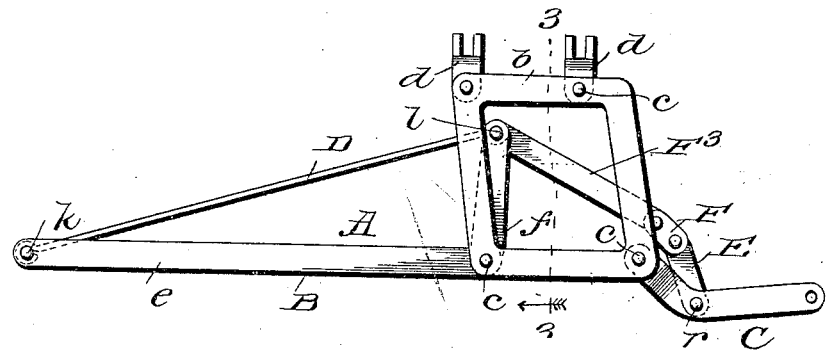
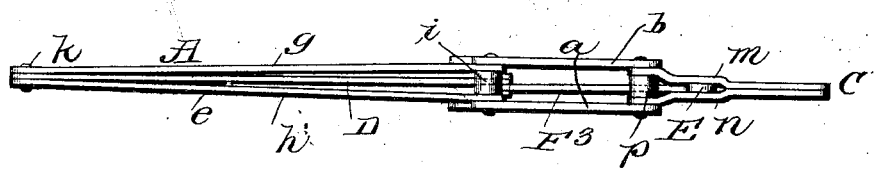
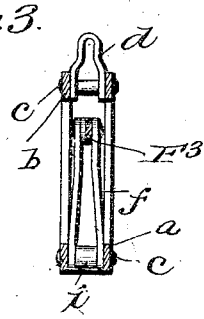
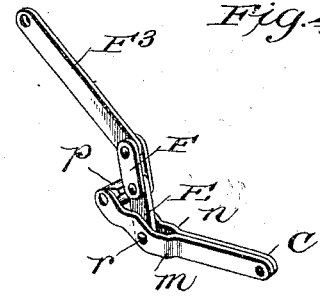
Witnesses
Inventor
F. M. Smiley
Attorney

UNITED STATES PATENT OFFICE.

FRANKLIN M. SMILEY, OF GOSHEN, INDIANA.

DRAFT-EQUALIZER.

946,405.　　　　　　Specification of Letters Patent.　　Patented Jan. 11, 1910.

Application filed August 28, 1908, Serial No. 450,630. Renewed November 8, 1909. Serial No. 526,891.

*To all whom it may concern:*

Be it known that I, FRANKLIN M. SMILEY, citizen of the United States, residing at Goshen, in the county of Elkhart and State of Indiana, have invented new and useful Improvements in Draft-Equalizers, of which the following is a specification.

My invention pertains to draft equalizers; and it has for its general object to provide a draft equalizer embodying such a construction that no one of its parts is subjected to undue strain incidental to use of the equalizer, and one in which great freedom of action is afforded and the pull is efficiently equalized during the swinging of the draft animals either to the right or to the left as when the wagon, plow or other apparatus to which the equalizer is attached is being turned.

Other objects and advantageous features of the invention will be fully understood from the following description and claims when the same are read in connection with the drawings, accompanying and forming part of this specification, in which:

Figure 1 is a plan view of the draft equalizer constituting the best practical embodiment of my present invention of which I am cognizant. Fig. 2 is a front elevation of the equalizer. Fig. 3 is a vertical section taken in the plane indicated by the line 3—3 of Fig. 1, looking in the direction indicated by arrow and illustrating the inner portion of the comparatively long lever. Fig. 4 is a detail perspective view illustrative of the comparatively short lever of the equalizer and the series of three links through which said lever is connected with the rearwardly directed angular arm of the long lever.

Similar letters designate corresponding parts in all of the views of the drawings, referring to which:

A is the body of my novel equalizer, which is preferably made of metal in substantially the form illustrated, and comprises a lower member $a$ and an upper member $b$. The said body members $a$ and $b$ are separated by an intervening space, Fig. 2, and are connected through the medium of four (more or less) vertical bolts $c$, the rear ones of which are preferably utilized for the attachment of links $d$, adapted for connection with a plow or other apparatus to be drawn.

On one of the front bolts $c$ is pivoted a long lever B, arranged to swing in a horizontal plane, and on the other front bolt $c$ is pivoted a short lever C, arranged to swing in the same horizontal plane. The long lever B has a long arm $e$ extending outward from the first named bolt $c$ and a short and angularly disposed arm $f$ extending rearwardly from the said bolt $c$, and said lever is made up of an upper metallic bar $g$ and a lower metallic bar $h$; said bars $g$ and $h$ being separated by a tubular collar $i$ on said bolt $c$, and the ends of the bars being connected by bolts or rivets $k$ and $l$. For the sake of increasing the stiffness and strength of the lever B, I prefer to provide the same with a brace rod D which extends between and is connected to the bolts or rivets $k$ and $l$. The short lever C is of the form of an obtuse angle in plan, and is made up of an upper bar $m$, of metal, and a lower metallic bar $n$; the said bars being separated at the inner end of the short lever by a tubular collar $p$ mounted on the respective bolt $c$ of the short lever.

Pivotally connected to the short lever C at the apex of the angle thereof, as indicated by $r$, is a link E which extends rearwardly from said apex, and pivotally connected to the rear end of the said link E is a second link F, formed, by preference, of upper and lower straps, while interposed between and pivotally connected to the link F and the inner and rear end of the long lever B is a link $F^3$.

By virtue of the provision of the series of links E, F and $F^3$ connected with and arranged as stated relative to the short lever C and the long lever B, it will be manifest that the connection formed by the said connected links is adapted to swing about the center of movement of the short lever C and in that way afford great freedom of action and equalize the pull incidental to turning of the plow or other apparatus to which the equalizer is attached and the swinging of the draft animals either to the right or to the left. It will also be observed that the said link connection maintains the pull at all times at the same distance from the fulcrum about which it moves, and in that way avoids the imposition of undue strain on any one of the parts of the equalizer.

I prefer in the practical use of my novel equalizer to attach three draft animals to the long lever B, and two draft animals to the short lever C, but have deemed it unnecessary to illustrate the trees through which the connections are effected.

It will be gathered from the foregoing that a draft equalizer constructed according to my invention tends to keep the load as near as possible behind the horse or horses hitched to the short lever C. This renders it feasible for a farmer using the equalizer in plowing to have the horse moving in the furrow on the lever C and the other horses moving on the unplowed ground, and yet drawing the plow quite as evenly as could be done were but two draft horses employed.

As before stated the construction herein illustrated and described constitutes the best practical embodiment of my invention of which I am aware, but it is obvious that in the future practice of the invention such changes or modifications may be made as fairly fall within the scope of the invention as defined in the claims appended.

Having described my invention, what I claim and desire to secure by Letters-Patent, is:

1. In a draft equalizer, the combination of a body, a long lever, of angular form, pivotally connected at the apex of its angle to the body and having its inner arm shorter than its outer arm and directed rearwardly, a short lever pivoted to the body at a point in alinement with the longitudinal axis of the outer arm of the long lever and having its fulcrum separated by an intervening space from that of the long lever, a link pivotally connected to the short lever at the opposite side of its fulcrum, with reference to the long lever, and extending rearwardly from said short lever, a link pivotally connected to the rearwardly directed arm of the long lever and extending from said point of connection toward the short lever, and a third link interposed between and connecting the adjacent ends of the two first-named links.

2. In a draft equalizer, the combination of an open body of approximate rectangular form in plan and comprising upper and lower members separated by an intervening space, and vertical bolts connecting the said members, a long lever, of angular form in plan, made up of upper and lower bars and pivotally mounted at the apex of its angle on one of the front bolts of the body and having its inner arm directed rearwardly, a collar mounted on said bolt between the upper and lower bars of the lever, a short lever pivoted at its inner end to the other front bolt of the body at a point in alinement with the outer arm of the long lever and having its fulcrum separated by an intervening space from that of the long lever, and also having upper and lower bars, a collar mounted on said bolt and between said upper and lower bars, a link pivotally connected to the short lever at the opposite side of its fulcrum, with reference to the long lever, and extending rearwardly from said short lever, a link pivotally connected to the rearwardly directed arm of the long lever and extending from said point of connection toward the short lever, and means flexibly connecting the adjacent ends of the said links.

In testimony whereof I have hereunto set my hand in presence of two subscribing witnesses.

FRANKLIN M. SMILEY.

Witnesses:
L. BURR WHIPPY,
B. F. DEAHL.